April 5, 1960

J. K. MOSHER 2,931,506

FLUID FILTERING DEVICE

Filed March 19, 1956

JAMES K. MOSHER
INVENTOR.

BY
Attorney

April 5, 1960     J. K. MOSHER     2,931,506
FLUID FILTERING DEVICE

Filed March 19, 1956     2 Sheets-Sheet 2

JAMES K. MOSHER
*INVENTOR.*

BY
*Attorney*

United States Patent Office 2,931,506
Patented Apr. 5, 1960

2,931,506
FLUID FILTERING DEVICE

James K. Mosher, Pasadena, Calif., assignor to Schulz Tool and Manufacturing Co., San Gabriel, Calif., a corporation of California Application March 19, 1956, Serial No. 572,258

8 Claims. (Cl. 210—436)

The present invention relates generally to a fluid filtering device and relates more specifically to a fluid filtering device incorporating means for collecting and removing contaminants therefrom.

It is an important object of the present invention to provide a fluid filtering device having novel means for removing contaminants collected in a sump forming a portion of the device.

Another important object of the present invention is to provide a fluid filtering device having a housing with novel means for mounting a filter therein and disposing a sump in operative association therewith.

It is a further object of the present invention to provide a novel sump arrangement for utilization with the fluid filter with means being provided in association with the sump for draining contaminants collected therein.

It is a still further object of the present invention to provide novel vent and drain valve means for utilization with a fluid filter or the like with means being provided for simultaneously operating such valve means.

It will be seen that the present invention has other important objects, advantages and features, some of which, with the foregoing, will be set forth in the following description in which a certain embodiment of the invention has been selected for illustrative purposes only in the drawings, accompanying and forming a part of the present specifications, and wherein.

Figure 1:
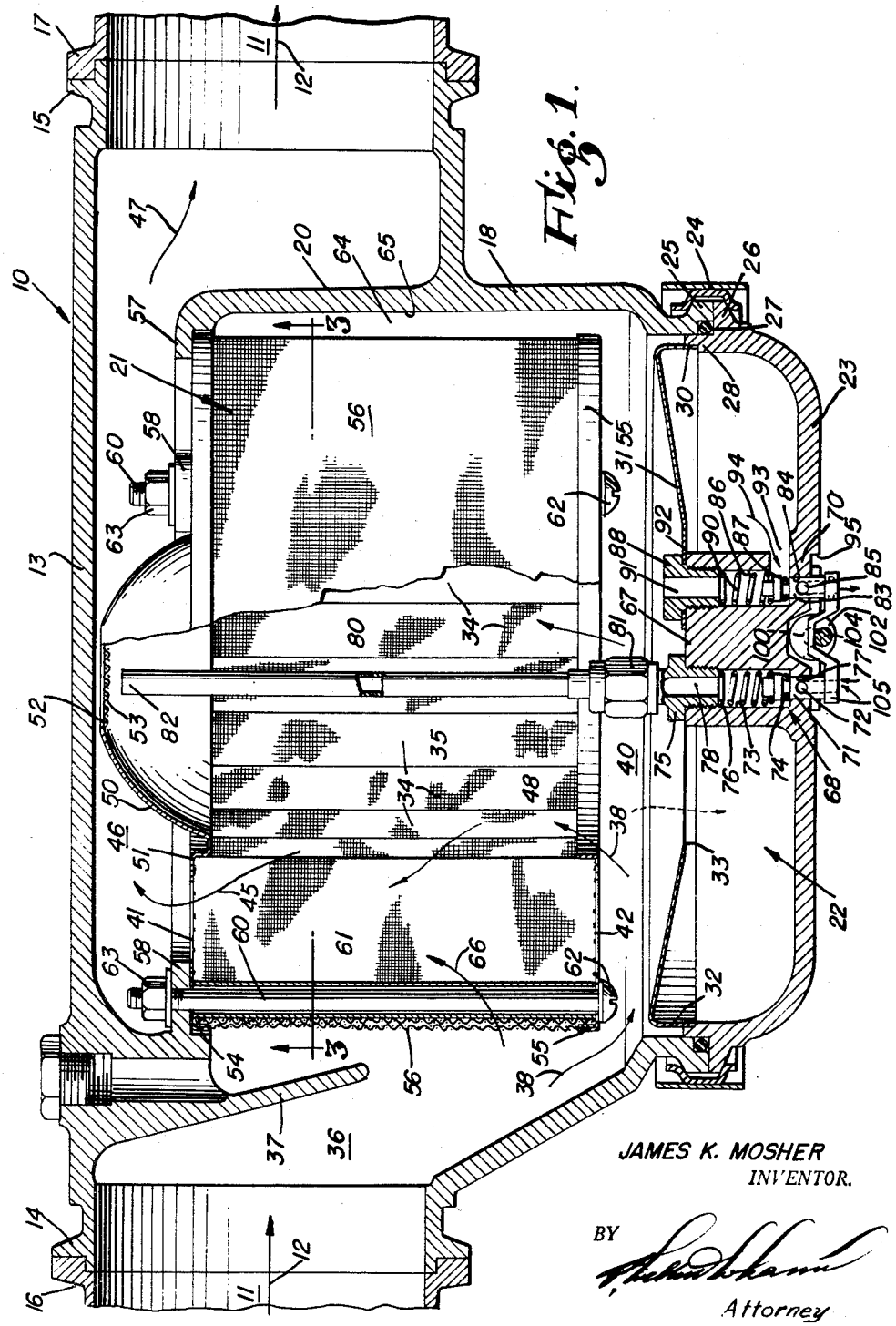
Fig. 1 is a longitudinal sectional view of the fluid filtering device and sump together with the combination vent and drain valves of the present invention.

Referring to the drawings, the fluid filtering device of the present invention is shown as indicated generally at 10. As shown, the device 10 may be installed in a fluid passage 11 through which fluid may be adapted to flow as in the direction of the arrows 12. While the present invention is applicable particularly to the filtering of liquid fuel or the like, it is to be specifically understood that other types of liquids may be utilized with equal facility without departing from the spirit and scope of the present invention.

As shown in the drawings, the device 10 includes a housing 13 that is provided with end fittings 14 and 15 which may be attached, as by any suitable means, to adjacent ends 16 and 17 respectively of the conduit passage 11. The housing 13 has a substantially cylindrical lower portion 18 which is coextensive with an inwardly directed cylindrical support structure 20 which is in turn adapted to support a filter indicated generally at 21.

A contaminant sump indicated generally at 22 is formed as by a cover 23 which is connected to the cylindrical extension 18 of the housing as by a clamp 24 acting in conjunction with a pair of flanges 25 and 26. A seating member 27 is disposed between the housing portion 18 and the cover 23 to provide a liquid tight seal therebetween. The sump 22 is enclosed as by the cover 23, the cover 23 having an upwardly directed flange 28 which is provided with an inwardly directed annular groove 30 adjacent the inner end thereof. An annular baffle 31 is positioned in the upper end of the sump 22 and defines an upper limit thereof, the baffle 31 having a peripheral flange 32 that is adapted for disposition in the annular groove 30 and retention therein. A centrally disposed annular opening 33 provides an entrance for the sump 22. It is to be noted that the baffle 31 is concave in a direction toward the sump 22 so that contaminants may be readily deposited therein.

Figure 3:
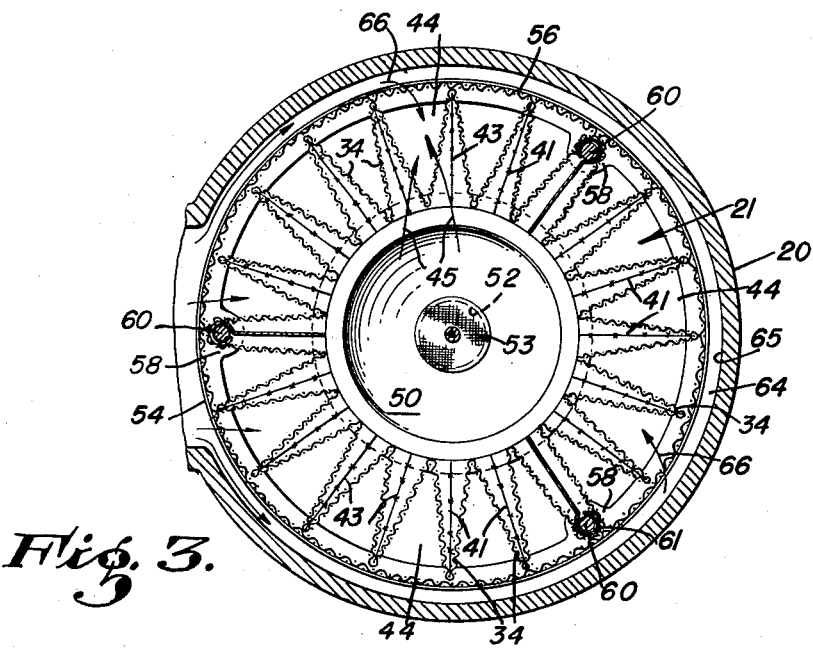
Fig. 3 is a transverse sectional view through the filter as taken substantially as indicated by line 3—3, Fig. 1.

As shown primarily in Figs. 1 and 3, the filter 21 comprises a plurality of corrugations 34 that are arranged in an annular pattern thus to define a hollow central area 35 through the filter. The axis of the filter 21 is disposed substantially normal to the axis of the conduit 11 with liquid from the conduit 11 being conducted through a passage 36 past a flow directing baffle 37 and in the direction of the arrows 38 into the central area of the convolutions 34. Accordingly, it may be seen that the liquid is conducted through a space 40 defined intermediate the lower edge of the filter 21 and the entrance to the sump 22. The filter corrugations 34 may be made from any suitable material such as, for example, various types of screen, cloth materials and fibrous elements, for example. Each of the corrugations 34 are secured together along their upper and lower edges, as indicated at 41 and 42 respectively, as by welding or other means so as to define flow paths from the central area through inwardly directed spaces 43 between the corrugations 34, outwardly through the corrugations and then upwardly through outwardly directed spaces 44 between adjacent corrugations. This flow path is indicated in Figs. 1 and 3 by the arrows 45 with the discharge from the filter entering a space 46 adjacent the upper limits of the housing 13. From the space 46, the liquid is conducted along the path indicated by the arrow 47 to the outlet from the present device and into the balance of the conduit 11 along the line indicated by the discharge arrow 12.

The inner lower periphery of the corrugations 34 of the filter 21 are retained in their configuration as by an annular angle member 48, with the upper edges being retained in position as by an annular cap member having an angle portion 51 formed thereon. The cap member 50 is semi-cylindrical and extends above the upper limits of the corrugations 34 and into the space 46. An annular opening 52 is formed in the upper end of the cap 50 with a filter screen 53 being disposed over the inner side of the opening 52. The outer limits of the corrugations 34 are retained in their configuration as by upper and lower angle members 54 and 55 respectively, there being an outer annular screen 56 disposed between the angles 54 and 55 and the outer extremities of the corrugations 34.

The upper surface of the angle 54 is adapted for engagement with an inwardly directed flange 57 formed on the upper end of the housing extension 20. The flange 57 has a plurality of inwardly directed tabs 58 through which mounting bolts 60 are adapted to extend. The mounting bolts 60 extend through tubular stiffening members 61 which are positioned adjacent the outer periphery of the filter 21 and extend through the filter between the opposed surfaces of the angles 54 and 55. Heads 62, on the bolts 60, are adapted to engage the outer surface of the angle 55, there being nuts 63 threadably engaging the outer ends of the bolts 60 and the upper surfaces of the tabs 58.

The filter 21 thus is retained in position with liquid flowing therethrough, along the paths 45, being conducted outwardly from the filter as by the annular space defined between outer and inner edges respectively of the annular angle members 51 and 54. Additionally, a portion of the liquid may enter the flow passages 44 through an annular space 64 defined between the outer screen 56 of the filter 21 and an inner surface 65 of the housing extension 18 and inwardly directed extension 20. In this instance, the liquid would flow along a path indicated by the arrows 66 and into the passages 44, thereafter to enter the area 46 and be discharged from the device.

As shown primarily in Fig. 1, a boss 67 is formed upwardly from the inside of the cover 23 and within the area of the sump 22. The boss 67 provides a housing for a vent valve indicated generally at 68 and a drain valve indicated generally at 70.

The vent valve 68 comprises a valve member 71, having a drain opening 72. The upper end of the valve member 71 extends into a bore 73 and is sealed with respect to the bore 73 as by the sealing member 74. A fitting 75 is threadably disposed in the upper end of the bore 73, there being a compression spring 76 disposed between the inner end of the fitting 75 and the valve member 71. The compression spring 76 acts to maintain the valve member in a normally closed position with the opening 72 being normally occluded by the sidewalls of a reduced diameter bore 77 in which the valve member 71 is reciprocally positioned. The fitting 75 is provided with an internal passageway 78 which communicates with the interior of a tube 80, with the fitting 75 being connected to the tube 80, as by a second fitting 81. The tube 80 extends upwardly along the axis of the filter 21 and through the space 35 within the interior of the filter. The upper end 82 of the tube 80 is positioned within the cap 50 adjacent the screen 53. This upper end 82 of the tube 80 thus is positioned above the upper limits of the corrugations 34 of the filter 21.

The drain valve 70 includes a valve member 83 that is reciprocally positioned within a bore 84 through the cover 23. An opening 85 in the valve member 83 normally is occluded by the sidewalls of the bore 84. The upper end of the valve member 83 extends into a bore 86 in the boss 67 and is sealed with respect to the space around the end of the bore 84 as by a sealing member 87. A fitting 88 is threadably disposed in the upper end of the bore 86, there being a compression spring 90 disposed between the inner end of the fitting 88 and the valve members 83 thereby to bias the valve member 83 toward a closed position. The fitting 88 has a bore 91 which communicates between the bore 86 and the entrance area 40 of the filter 21. The fitting 88 also serves, through a baffle tab 92, to retain the baffle 31 in position on the boss 67. An opening 93, through the wall of the boss 67, communicates between the lower end of the sump 22 and the lower end of the bore 86 thus to provide a flow path along the line of the arrow 94 from the sump to the drain valve member 83.

Figure 2:
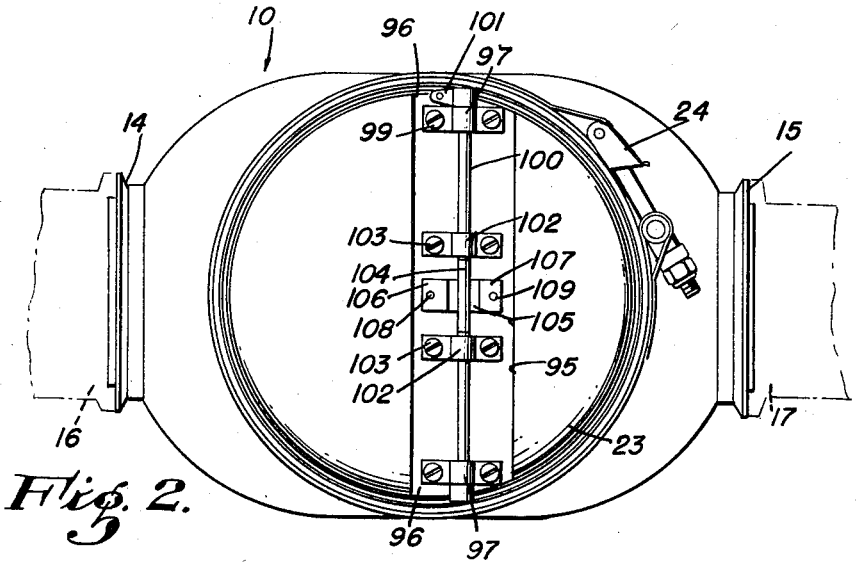
Fig. 2 is a bottom view on a reduced scale of the device shown in Fig. 1.

As shown primarily in Figs. 1 and 2, the cover 23 is provided, on its outer surface, with a transversely extending groove 95. The groove 95 is raised above the level of the cover 23 adjacent the ends 96 thereof, in order to provide a support for bearings 97. The bearings 97 are secured in position as by screws 99 and are adapted to rotatably support the outer ends of a shaft 100. The extreme outer ends of the shaft 100 are provided with cranks 101 while the central area of the shaft 100 is supported by additional bearings 102 which are in turn retained in position on the surface of the groove 95 as by screws 103. The shaft 100 is provided with a centrally disposed eccentric portion 104 that is adapted for engagement with a valve operating member 105. The valve operating member has laterally extending portions 106 and 107, that are provided with openings 108 and 109 respectively, which in turn communicate with the openings 72 and 85 in the valve members 71 and 83 respectively.

It may thus be seen that upon rotation of the shaft 100 as by the cranks 101, the eccentric portion 104 carried by the shaft 100 will depress the valve operating member 105 in a direction toward the cover 23, thereby to move the valve members 71 and 83 with respect to the bores 77 and 84. This simultaneous operation of the vent and drain valves 68 and 70 respectively, provides vent communication through the tube 80 with atmosphere and communication between the sump 22 and atmosphere, as by the passage 94 and openings 85 and 109. Inasmuch as the tube 80 extends above the upper limits of the corrugations 34 of the filter 21, air will be bled into the tube 80, as by the passage 108, opening 72, bore 73 and passage 78. The fluid retained within the interior of the filter 21 thereby will be utilized to flush contaminants that may be collected in the sump 22 out through the drain valve 70.

In normal filtering operation of the present device, it is to be noted that the majority of the liquid entering through the conduit 11 will be deflected along the path indicated by the arrows 38, as by the baffle 37 and into the interior 35 of the filter 21. Any contaminants collected outwardly from the outer screen 56 will travel downwardly and be collected on the baffle 31 thereafter passing through the opening 33 and into the sump 22. This also applies to any contaminants that may be collected on the various corrugations 34, on the inner sides thereof, which will pass downwardly along the surfaces of the corrugations and outwardly through an annular opening defined between the outer periphery of the angle 48 and the inner periphery of the angle 55.

It is also to be noted that the tube 80 is disposed adjacent the screen 53 and that the end 82 of the tube 80, thereby senses and bleeds air into the area 46 above the upper limits of the filter 21. Any fluid entering the cap 50 will pass through the screen 53, thereby being filtered, with contaminants traveling downwardly and into the sump 22. Drainage from the sump 22 may be accomplished at various intervals as by manual operation of the cranks 101. Alternately, the cranks 101 may be connected to an automatic arrangement for automatically and simultaneously opening the valves 68 and 70, as conditions of the particular installation may dictate.

From the foregoing description, the uses, advantages and operation of the present invention will be readily understood by those skilled in the art to which the invention appertains. While there has been described a certain embodiment of the invention, it is desired to emphasize the fact that the invention may be applied to various types of filter and valve arrangements, to have it understood that the example given is merely illustrative, and that the invention is not to be limited to the details disclosed herein but is to be accorded the full scope of the appended claims.

I claim:

1. In a simultaneously operable vent and drain valve arrangement for use with a fluid filter and interconnected contaminant sump: a flow passage for conducting fluid through said filter; first passage means providing communication between atmosphere and said flow passage downstream from said filter; a vent valve in said first passage means; second passage means providing communication between atmosphere and said sump; a drain valve in said second passage means; and means for simultaneously opening said vent and drain valves.

2. In a simultaneously operable vent and drain valve arrangement for use with a fluid filter and interconnected contaminant sump: a flow passage for conducting fluid through said filter; first passage means extending through said filter and providing communication between atmosphere and said flow passage downstream from said filter; a vent valve in said first passage means; second passage means providing communication between atmosphere and said sump; a drain valve in said second passage means; and means for simultaneously opening said vent and drain valves.

3. A combination filter, sump and valve arrangement comprising: a housing; a filter disposed in said housing; a sump disposed in said housing; an intake for said sump, said intake communicating with said filter adjacent an upstream end thereof; conduit means for conducting fluid to and from said filter; primary passage means extending through said filter and providing communication between atmosphere and said conduit means downstream from said filter; a normally closed vent valve in said primary passage means; secondary passage means for providing communication between atmosphere and said sump; a normally closed drain valve in said secondary passage means; passage means communicating between said drain valve and said intake to said sump; and means for simultaneously opening said vent and drain valves.

4. A combination filter, sump and valve arrangement comprising: a housing; a hollow filter disposed in said housing, said filter being adapted for fluid flow therethrough from the inside outwardly and upwardly therefrom; a sump disposed in said housing; an intake for said sump, said intake communicating with said filter adjacent an upstream end thereof; baffle means in said intake of said sump; conduit means for conducting fluid to and from said filter; primary passage means providing communication between atmosphere and said conduit means downstream from said filter; a normally closed vent valve in said primary passage means; secondary passage means for providing communication between atmosphere and said sump; a normally closed drain valve in said secondary passage means; and means for simultaneously opening said vent and drain valves.

5. A combination filter, sump and valve arrangement comprising: a housing; a hollow filter disposed in said housing, said filter being adapted for fluid flow therethrough from the inside outwardly and upwardly therefrom; a sump disposed in said housing; an intake for said sump, said intake communicating with said filter adjacent an upstream end thereof; baffle means in said intake of said sump; conduit means for conducting fluid to and from said filter; primary passage means extending through said filter and providing communication between atmosphere and said conduit means downstream from said filter; a normally closed vent valve in said primary passage means; secondary passage means for providing communication between atmosphere and said sump; a normally closed drain valve in said secondary passage means; passage means communicating between said drain valve and said intake to said sump; and means for simultaneously opening said vent and drain valves.

6. A fluid filtering device comprising: a housing; aligned flow passage means providing a fluid entrance and discharge for said housing; a substantially cylindrical filter disposed in said housing and having an axis arranged substantially normal to said flow passage means; means for directing fluid flow from said entrance into the interior of said filter; a sump disposed below said filter; an intake for said sump; a vent valve; a drain valve, said valves being normally closed, positioned in said sump and providing communication with atmosphere, said drain valve also providing communication with said sump; a conduit leading from said vent valve to a downstream end of said filter; and means for simultaneously opening said valves whereby to permit drainage from said sump.

7. A fluid filtering device comprising: a housing; aligned flow passage means providing a fluid entrance and discharge for said housing; a substantially cylindrical corrugated screen type filter disposed in said housing and having an axis arranged substantially normal to said flow passage means; means for directing fluid flow from said entrance into the interior of said filter; a sump disposed below said filter; an intake for said sump; a vent valve, said intake being surrounded by an annular baffle; a drain valve, said valves being normally closed, positioned in said sump and providing communication with atmosphere, said drain valve also providing communication with said sump; a conduit leading from said vent valve to a downstream end of said filter; and means for simultaneously opening said valves whereby to permit drainage from said sump.

8. In an apparatus comprising a vent and drain valve arrangement for use in a fluid filter and interconnected contaminant sump in combination: means comprising a container having a filter therein with a flow passage through said container; means forming a first passage providing communication between atmosphere and said flow passage comprising a stand pipe extending upwardly from the lower part of said container; a vent valve in said first passage means; second passage means providing communication between atmosphere and said sump; a drain valve in said second passage means; and means for opening said vent and drain valves.

References Cited in the file of this patent

UNITED STATES PATENTS

| | | |
|---|---|---|
| 314,692 | Leavitt et al. | Mar. 31, 1885 |
| 1,055,744 | Hans | Mar. 11, 1913 |
| 1,574,365 | Casey | Feb. 23, 1926 |
| 1,696,487 | Jervis | Dec. 25, 1928 |